Jan. 21, 1936.  J. P. CONROY  2,028,649
BROILER
Filed Sept. 5, 1934   2 Sheets-Sheet 2
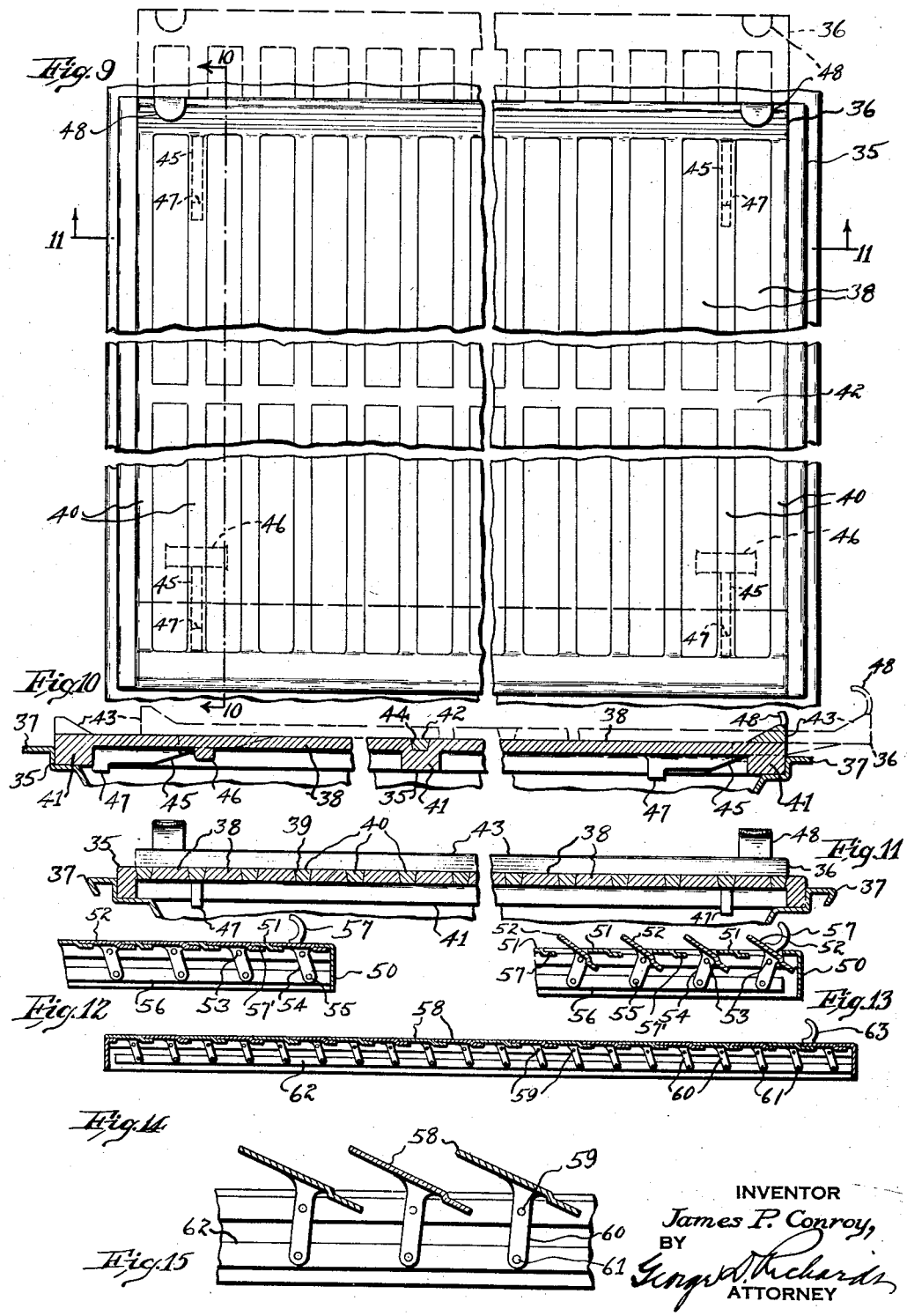
INVENTOR
James P. Conroy,
BY
George D. Richards
ATTORNEY Patented Jan. 21, 1936

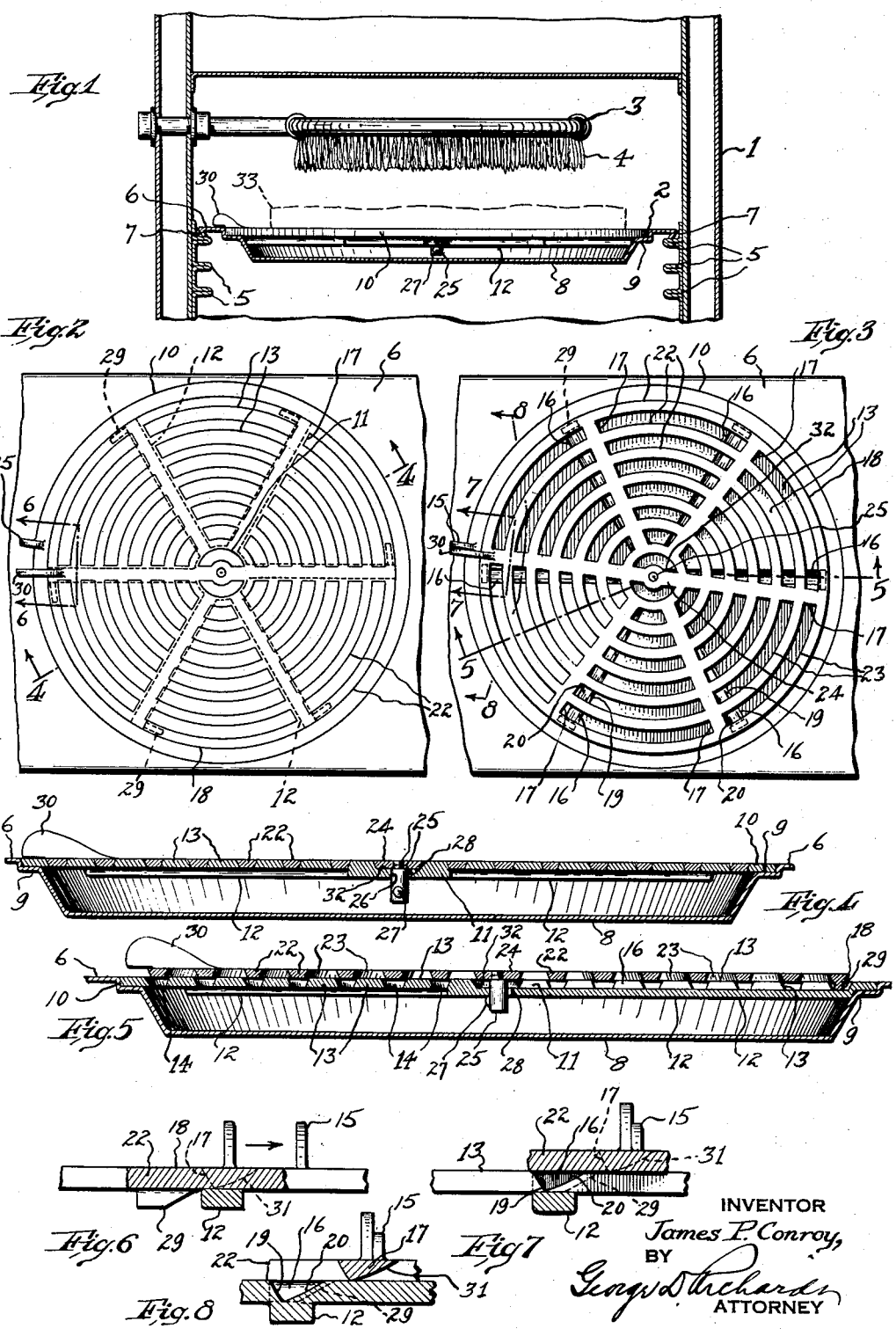

2,028,649

UNITED STATES PATENT OFFICE 2,028,649

BROILER

James P. Conroy, East Orange, N. J.

Application September 5, 1934, Serial No. 742,719

10 Claims. (Cl. 53—6)

This invention relates, generally, to the broiling of meat, fish, and other foods, and the invention has reference more particularly to a novel and improved broiler adapted for use in gas, electric and other stoves or ranges.

Broilers as heretofore constructed generally consist of wire screens or grids, the meat or other food to be broiled being placed upon the grid, and a flame applied from above. This common type of broiler is unscientific and does not produce perfectly broiled food, because the hot flame from above, in singeing the upper surface of the food, drives the vital juices, such as meat juices, downwardly through the unsinged lower face of the meat, through the slots of the broiler grid, and into the broiler pan below, so that when the meat is turned over for singeing the under surface thereof, i. e. if the meat is turned at all, the best juices have already escaped. Also, the juices, together with fat and greases collecting in the broiler pan, create a fire hazard, and the flame from above readily ignites this combustible material, thereby often causing dangerous and sometimes serious fires, which are difficult to extinguish.

The principal object of the present invention is to provide a novel broiler that overcomes the above recited defects of ordinary broilers, the said broiler being adapted to produce perfectly broiled food.

Another object of the present invention lies in the provision of a novel broiler of the above character that is arranged to provide a smooth, level and unbroken supporting surface for effectively singeing the meat or other food from below, thereby preventing the escape of vital juices, the said broiler being operatable, during the broiling operation, to permit the escape of fats and other substances downwardly into the broiler pan.

Still another object of the present invention is to provide a novel broiler of the above character that is so constructed and arranged as to substantially prevent the ignition of the fats and other matter within the broiler pan, the said broiler providing means whereby, in the event this combustible material within the broiler pan should take fire, the said fire may be easily and immediately extinguished.

Other objects and advantages will become apparent from the specification, taken in connection with the accompanying drawings wherein the invention is embodied in concrete form.

In the drawings:—

Fig. 1 is the fragmentary, vertical sectional view illustrating a portion of a gas stove equipped with the novel broiler of the present invention.

Fig. 2 is the plan view, with parts broken away, of the broiler shown in Fig. 1, the parts of the broiler being positioned for singeing the meat or other food.

Fig. 3 is the view similar to Fig. 2, but illustrates the parts of the broiler positioned for broiling the meat or food.

Fig. 4 is an enlarged sectional view taken along the line 4—4 of Fig. 2, looking in the direction of the arrows.

Fig. 5 is an enlarged sectional view taken along the line 5—5 of Fig. 3, looking in the direction of the arrows.

Fig. 6 is a fragmentary sectional view taken along the line 6—6 of Fig. 2, looking in the direction of the arrows.

Fig. 7 is a fragmentary sectional view taken along the line 7—7 of Fig. 3, looking in the direction of the arrows.

Fig. 8 is a fragmentary sectional view taken along the line 8—8 of Fig. 3, looking in the direction of the arrows.

Fig. 9 is a plan view with parts broken away of a somewhat modified form of construction, the singeing position of the broiler parts being shown in full lines, while the broiling position of the broiler parts are shown in broken lines.

Fig. 10 is a sectional view taken along the line 10—10 of Fig. 9, looking in the direction of the arrows.

Fig. 11 is a sectional view taken along the line 11—11 in Fig. 9, looking in the direction of the arrows.

Fig. 12 is a fragmentary sectional view of another modified form of construction shown with its parts in food-singeing position.

Fig. 13 is a view similar to Fig. 12, but illustrates the broiler parts in food broiling position.

Fig. 14 is a sectional view of another modified form of broiler construction, the parts of the broiler being shown in food-singeing position, and Fig. 15 is an enlarged fragmentary sectional view illustrating the structure of Fig. 14 in food broiling position.

Similar characteristics of reference are employed in the above views, to indicate corresponding parts.

Referring now to Figs. 1 to 8 of the said drawings, the reference numeral 1 designates a gas or other stove equipped with the novel broiler of this invention, the said broiler being designated as a whole by the reference numeral 2. Stove 1 is provided with a heater unit 3 for directing a flame 4 downwardly toward the upper surface of the broiler 2. The stove 1 is illustrated as provided with the usual slides 5 for supporting the broiler 2 at adjustable heights with respect to the heating unit 3.

The broiler 2 comprises a tray 6 that is of rectangular, square, or other suitable shape in plan, the said tray being illustrated as provided at its side edges with downturned flanges 7 for slidably resting upon the slides 5 as especially shown in Fig. 1. The tray 6 is formed with a shallow pan portion 8 which is illustrated in Figs. 1 to 5 as of circular shape in plan, the said pan portion 8 serving as the broiler pan for receiving fats and greases and the like dropping from the food being broiled.

An annular, horizontal supporting shelf or step 9 is provided at the periphery of the pan 8, the top surface of the shelf 9 being depressed somewhat below the top of the tray 6 for accommodating a circular removable grid 10. The lower peripherial portion of the grid 10 is adapted to rest upon the shelf 9 while the upper surface of this grid is flush with the upper surface of the tray 6, as shown in Fig. 4.

The broiler grid 10 comprises a central hub portion 11, having a plurality of angularly spaced radial arms or ribs 12 projecting therefrom. Supported integrally upon the ribs 12 are a plurality of concentric, annular bars 13, that are mutually spaced from one another by annular slots 14. The opposite sides of each of the bars 10 are oppositely inclined, whereby these bars are of trapeziform cross section, as shown in Figs. 4 and 5, the spacing of the lower edges of any two adjacent bars being less than the spacing of the upper edges thereof. The outermost bar 13 is provided with an upwardly projecting lug or finger piece 15.

The bars 13 are cut away along radial lines above each of the ribs 12 to provide radial slots 16 for accommodating the radial ribs 17 of a second or complementary circular grid 18. One side wall 19 of each of the radial slots 16 (see Fig. 8) is sharply inclined, whereas the opposite side wall 20 is more gradually inclined, the said side walls 19 and 20 converging together at the bottom of slot 16, so that each of these slots are of approximately V-shape in cross-section for conformably receiving the similarly shaped radial ribs 17 of the complementary grid 18.

The grid 18 comprises a plurality of concentric, annular bars 22, that are mutually spaced from one another by annular slots 23. The bars 22 are of the same cross-section as the annular slots 14 of the supporting grid 10 and these bars 22 are respectively aligned with the respective slots 14 so that the bars 22 may enter slots 14 as illustrated in Fig. 4. The annular slots 23 of the complementary grid 18 are of the same cross-section as the bars 13 of the first named grid 10, and are adapted to conformably receive the bars 12 when the grid 18 is lowered so that its bars 22 enter the slots 14. The innermost annular bar 22 of the grid 18 positioned substantially at the center of this grid has a diametric rib 24 (see Fig. 3) carrying a pivotal pin 25, which pivotal pin projects downwardly through a bearing aperture 26 provided in the hub portion 11 of the lower grid 10. Pin 25 is illustrated provided with a boss 27 to prevent the accidental separation of grids 10 and 18, as during the ordinary handling of these grids. A vertical slot 28 in hub portion 11 adjoining aperture 26 enables boss 27 to be passed downwardly through hub portion 11 when the grids 10 and 18 are assembled.

The outermost annular bar 22 of grid 18 has a plurality of angularly spaced cams 29 depending from the under surface thereof, while the upper surface of this bar has a finger piece 30 projecting upwardly therefrom. Finger piece 30 is positioned near finger piece 15 of the grid 10. By pressing these two pieces towards each other from their positions shown in Fig. 2 to their abutting positions shown in Fig. 3, the complementary grid 18 is turned upon the lower grid 10, causing cams 29 to ride up on radial ribs 12 of the lower grid, as especially shown in Figs. 3, 5, 6, and 8, thereby effecting the raising of the grid 18 with respect to grid 10, so that the bars 22 of the grid 18 are moved out of the slots 14 of the grid 10 as especially shown in Fig. 5. Owing to the trapeziform cross-section of bars 22 and slots 14, this raising of the grid 18 with respect to grid 10 has the effect of providing narrow annular passageways extending from above the grid 18 downwardly into pan 8, as especially shown in Fig. 5, thereby enabling grease and other matter to pass downwardly into this pan.

The turning movement of the grid 18 with respect to grid 10 is limited by the two finger pieces 15 and 30 abutting one another, as shown in Fig. 3. The turning movement of the upper grid 18 over the lower grid 10 is facilitated by the beveled side walls 20 of the slots 16, and in fact, the cams 29 could be omitted if desired and these beveled side walls 20 depended upon for raising the grid 18 with respect to grid 10, as the former is turned. This will be obvious from an inspection of Fig. 8 wherein it is apparent that the beveled side 31 of rib 17 will readily ride up over the beveled side wall 20 of slot 16. The hub portion 11 of the lower grid 10 is provided with a diametric slot 32 (see Fig. 3) for receiving the rib 24 when the complementary grid 18 is lowered into the main or supporting grid 10. This lowering operation is accomplished by merely turning the finger piece 30 away from finger piece 15.

In use, assuming that it is desired to broil a steak, the upper grid 18 is turned by means of finger piece 30, if necessary, so that this finger piece is spaced from finger piece 15, as shown in Figs. 2 and 4. In this position of the upper grid 18, the same will rest within the slots provided therefor in the lower grid 10, i. e., the complementary bars 13 and 22 lie in a common plane, and the upper surface of these bars produce a smooth, continuous and uninterrupted level surface, as shown in Fig. 4. The heating unit 3 is now lighted and the broiler is allowed to heat up for about five minutes, during which time the grids 10 and 18 become quite hot. The tray 6 is then pulled forwardly and the steak 33 is placed thereon. Since the flat upper surface of the broiler is extremely hot, the under surface of the steak is immediately singed throughout its area by this hot surface, thereby trapping the vital juices within the steak so that the same cannot run out under the action of the heat of flame 4. In a few moments the tray 6 may again be pulled forwardly and the steak turned over, thereby causing the singeing of the upper surface of the steak. After this upper surface has been singed the finger piece 30 is pressed toward the finger piece 15, thereby turning and raising the upper grid 18 with respect to the lower grid 10. Narrow annular apertures are now provided in the broiler for permitting fat and waste oils to escape downwardly through slots 23 and 14 into pan 8. Since both surfaces of the steak have been singed, the vital juices thereof are retained therein during the broiling operation, thereby causing the steak to be broiled perfectly.

With the broiler grid 18 turned into broiling position shown in Fig. 5, the annular bars 22 of grid 18 still overlie the annular slots 14 of the lower grid so that it is extremely difficult for the flame 4 to ignite any combustible fat or other material within pan 8. However, should the combustible material within pan 8 become ignited, it is merely necessary to turn finger piece 30 away from finger piece 15 into the position shown in Fig. 2 so that the grids 10 and 18 are moved to their singeing positions shown also in Fig. 4, in which position any fire within pan 8 is immediately and effectively snuffed out for lack of air. Thus, when using the novel broiler of the present invention, the fire hazard heretofore always present with common broilers is eliminated.

In the form of the invention shown in Figs. 9 to 11, the lower and upper grids 35 and 36 respectively, are of rectangular shape instead of circular. The grid 35 is adapted to be supported on a tray 37 similar to the tray 6 previously described. The bars 38 of the lower grid 35 are trapeziform in shape and extend parallel to one another, the same being mutually spaced from one another by slots 39 which serve to receive the bars 40 of the upper grid 36. The bars 38 of the lower grid are connected to and supported upon ribs 41 extending transversely of the grid 35 beneath the bars 38. The bars 40 of the upper grid are interconnected and supported by a central rib 42 and end ribs 43, rib 42 being adapted to enter a conforming groove 44 provided in the bars 38 when the upper grid 36 is set into the lower grid as shown in Figs. 10 and 11. The ribs 43 overlie the bars 40 and hence also overlie bars 38 when the upper grid is set into the lower grid as shown in Figs. 10 and 11. Certain of the bars 40 of the upper grid carry depending cams 45 adjacent to the rear of the grid for engaging short auxiliary ribs 46 provided on the lower grid 35. Additional cams 45 are attached to these bars 40 adjacent to the front of the grid for cooperating with the forward rib 41 of the lower grid 35. The cams 45 have depending stops 47 at their rear ends. The forward rib 43 of the upper grid 36 is preferably provided with handles 48.

In use, the meat or the food is first singed while the upper or movable grid 36 is set into the lower stationary grid 35, as shown in full lines in Figs. 9 to 11. After the singeing operation, the handles 48 are pulled forwardly, thereby causing cams 45 to ride up on ribs 46 and 41, thereby raising the upper movable grid 36 so that its bars 40 are moved out of slots 39, thereby allowing grease and other material to pass downwardly and into the broiler pan. The forward movement of the upper grid 36 is limited by stops 47 engaging auxiliary ribs 46 and forward ribs 41. After the food has been broiled, the upper grid may be again inserted into the lower grid by pushing rearwardly upon the handles 48. In this form of invention, the bars 40 of the upper grid 36 overlie the slots 39 of the lower grid during the broiling operation, thereby greatly aiding in preventing the ignition of combustible material within the pan portion of tray 37. However, should this combustible material catch fire, it may readily be extinguished by pushing the handles 48 rearwardly, thereby causing the upper or movable grid 36 to enter the lower grid 35.

In the form of the invention shown in Figs. 12 and 13, the broiler 50 illustrated, is of square or rectangular shape in plan, and has a stationary grid comprising transverse bars 51 that are mutually spaced from one another. This broiler also comprises a movable grid having transverse bars 52 that are pivoted upon pins 53 carried by the frame of the broiler 50. Bars 52 have depending tongues or lugs 54 that are pivotally connected by pins 55 to a movable link 56. A handle 57 is provided on the forward movable grid bar 52. When the handle 57 is pushed rearwardly as shown in Fig. 12, the bars 52 of the movable grid are set into conforming recesses 51' provided in the bars 51 of the stationary grid, thereby providing a flat surface for singeing food. When the handle 57 is pulled forwardly, the bars on the movable grid are turned upwardly as shown in Fig. 13, thereby raising the food off bars 51 and at the same time providing apertures through the broiler for enabling fats and other material to enter the broiler pan (not shown) below.

In the form of invention shown in Figs. 14 and 15, the stationary grid is omitted altogether. A movable grid having movable bars 58 is employed, which bars are pivoted upon pins 59 that are fixed to the frame of the broiler. In this form of invention, the bar 58 of the movable grid has tongues or lugs 60 that are pivotally connected by pins 61 to a movable link 62, so that when the handle 63 is manipulated, all of the bars 58 are moved. Thus these bars may be set into a horizontal position as shown in Fig. 14 for singeing, or into an inclined position shown in Fig. 15 for broiling, in which latter position spaces are provided to enable fats and greases to enter the broiler pan (not shown).

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. A broiler of the character described having movable bars for serving as a food supporting surface, and means for moving said bars, whereby when said bars are in one position they enable the broiler to provide a continuous, smooth and unbroken surface for supporting food during the singeing thereof, and when said bars are in another position they enable the broiler to provide an apertured upper surface for supporting food during the broiling thereof.

2. In a broiler of the character described, a movable grid, said broiler presenting a flat, smooth and continuous upper surface when said grid is in one position, as when singeing food, and presenting a broken, apertured upper surface when said grid is in another position, as when broiling food.

3. In a broiler of the character described, a movable grid, and a cooperating relatively stationary grid, said movable grid being movable into said stationary grid to cause said broiler to have a smooth, unbroken upper supporting surface for singeing foods, and said movable grid being movable out of said stationary grid to cause said broiler to have an apertured upper surface, as for broiling foods.

4. In a broiler of the character described, a tray having a pan portion, a relatively stationary grid supported upon said tray above said pan portion, and a relatively movable grid mounted on said stationary grid, said movable grid being movable into said stationary grid to cause said broiler to have a smooth, unbroken upper surface for singeing food, and being movable out of said stationary grid to provide an apertured upper surface for broiling foods.

5. In a broiler of the character described, a tray having a pan portion, a relatively stationary circular grid supported upon said tray above said pan portion, and a relatively movable circular grid mounted on said stationary grid, said movable grid having bars and said stationary grid having apertures for receiving said bars, whereby said movable grid may be moved into said stationary grid to cause said broiler to have a smooth, unbroken upper supporting surface as during food singeing operations, said movable grid being movable out of said stationary grid, thereby providing apertures through said broiler grids as during food broiling operations.

6. In a broiler of the character described, a tray having a pan portion, a grid supported upon said tray above said pan portion, said grid comprising a plurality of mutually spaced bars of trapeziform cross section, a second grid supported upon said first named grid and movable into and out of said first named grid, said second grid comprising a plurality of mutually spaced bars of trapeziform cross section, the bars of said second grid being disposed for entering the spaces between the bars of the first named grid, whereby, when said second grid is moved into said first named grid so that the bars of the second grid enter the spaces between the bars of the first named grid, said grids cooperate to provide a smooth, unbroken upper surface for said broiler, said second grid, when moved out of said first named grid, causing relatively narrow apertures to extend through said grids, whereby grease and other material may flow downwardly and into said pan portion.

7. In a broiler of the character described, a tray having a pan portion, a circular grid supported upon said tray above said pan portion, said grid comprising a plurality of mutually spaced annular bars of trapeziform cross section, a second circular grid supported upon said first named grid and movable into and out of said first named grid, said second grid comprising a plurality of mutually spaced annular bars of trapeziform cross section, the bars of said second grid being disposed for entering the spaces between the bars of the first named grid, whereby, when said second grid is moved into said first named grid so that the bars of the second grid enter the spaces between the bars of the first named grid, said grids cooperate to provide a smooth, unbroken upper surface for said broiler, said second grid, when moved out of said first named grid providing relatively narrow apertures through said grids, whereby grease and other material may flow downwardly and into said pan portion, said grids having cooperating stops for limiting their relative motion.

8. In a broiler of the character described, a tray having a pan portion, a grid supported upon said tray above said pan portion, said grid comprising a plurality of mutually spaced bars of trapeziform cross section, a second grid supported upon said first named grid and having cam means for engaging said first named grid, whereby said second grid may be moved into and out of said first named grid, said second grid comprising a plurality of mutually spaced bars of trapeziform cross section, the bars of said second grid being disposed for entering the spaces between the bars of the first named grid, whereby, when said second grid is moved into said first named grid so that the bars of the second grid enter the spaces between the bars of the first named grid, said grids cooperate to provide a smooth, unbroken upper surface for said broiler, said second grid, when moved out of said first named grid, causing relatively narrow apertures to extend through said grids, whereby grease and other material may flow downwardly and into said pan portion, said grids having cooperating stop means for limiting their relative movement.

9. In a broiler of the character described, a tray having a pan portion, a rectangular grid supported upon said tray above said pan portion, said grid comprising a plurality of mutually spaced parallel bars of trapeziform cross section, a second grid supported upon said first named grid and movable with respect thereto, said second grid comprising a plurality of mutually spaced parallel bars of trapeziform cross section, the bars of said second grid being disposed for entering the spaces between bars of the first named grid, whereby, when said second grid is moved into said first named grid so that the bars of the second grid enter the spaces between the bars of the first named grid, said grids cooperate to provide a smooth, unbroken upper surface for said broiler, said second grid, when moved out of said first named grid, providing relatively narrow apertures through said grids, whereby grease and other material may flow downwardly and into said pan portion.

10. In a broiler of the character described, a grid comprising a plurality of pivoted bars, link means interconnecting said bars for similarly actuating the same, said bars when moved to one position serving to provide a smooth, unbroken upper surface for said broiler for use in singeing food, and when moved to another position serving to provide a broken, apertured upper surface for use during broiling operations.

JAMES P. CONROY.